United States Patent
Narwariya et al.

(10) Patent No.: US 12,136,035 B2
(45) Date of Patent: Nov. 5, 2024

(54) NEURAL NETWORKS FOR HANDLING VARIABLE-DIMENSIONAL TIME SERIES DATA

(71) Applicant: Tata Consultancy Services Limited, Mumbai (IN)

(72) Inventors: Jyoti Narwariya, Noida (IN); Pankaj Malhotra, Noida (IN); Vibhor Gupta, Noida (IN); Vishnu Tankasala Veparala, Hyderabad (IN); Lovekesh Vig, Gurgaon (IN); Gautam Shroff, Gurgaon (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 758 days.

(21) Appl. No.: 17/180,976

(22) Filed: Feb. 22, 2021

(65) Prior Publication Data
US 2021/0406603 A1 Dec. 30, 2021

(30) Foreign Application Priority Data
Jun. 26, 2020 (IN) .............................. 202021027212

(51) Int. Cl.
*G06N 3/08* (2023.01)
*G06F 18/214* (2023.01)
*G06N 3/048* (2023.01)

(52) U.S. Cl.
CPC ........... *G06N 3/08* (2013.01); *G06F 18/2148* (2023.01); *G06N 3/048* (2023.01)

(58) Field of Classification Search
CPC .......... G06N 3/08; G06N 3/048; G06N 3/044; G06N 3/045; G06F 18/2148
See application file for complete search history.

(56) References Cited

U.S. PATENT DOCUMENTS

| 11,277,425 B2* | 3/2022 | Kulkarni ................. G06F 18/29 |
| 2019/0080225 A1* | 3/2019 | Agarwal .................. G06F 18/22 |

(Continued)

FOREIGN PATENT DOCUMENTS

| CN | 111079931 A | 4/2020 |
| CN | 111177224 A | 5/2020 |
| WO | WO 2020/064990 A1 | 4/2020 |

OTHER PUBLICATIONS

Che, Zhengping, et al. "Recurrent neural networks for multivariate time series with missing values." Scientific reports 8.1 (2018): 6085. (Year: 2018).*

(Continued)

*Primary Examiner* — Li B. Zhen
*Assistant Examiner* — Henry Nguyen
(74) *Attorney, Agent, or Firm* — FINNEGAN, HENDERSON, FARABOW, GARRETT & DUNNER LLP (57) ABSTRACT

Several applications capture data from sensors resulting in multi-sensor time series. Existing neural networks-based approaches for such multi-sensor/multivariate time series modeling assume fixed input-dimension/number of sensors. Such approaches can struggle in practical setting where different instances of same device/equipment come with different combinations of installed sensors. In the present disclosure, neural network models are trained from such multi-sensor time series having varying input dimensionality, owing to availability/installation of different sensors subset at each source of time series. Neural network (NN) architecture is provided for zero-shot transfer learning allowing robust inference for multivariate time series with previously unseen combination of available dimensions/sensors at test time. Such combinatorial generalization is achieved by conditioning layers of core NN-based time series model with "conditioning vector" carrying informa- (Continued)

tion of available sensors combination for each time series and is obtained by summarizing learned "sensor embedding vectors set" corresponding to available sensors in time series.

12 Claims, 3 Drawing Sheets

(56) References Cited

U.S. PATENT DOCUMENTS

2020/0065617 A1\* 2/2020 Sharma ............... G06T 7/33
2020/0371491 A1\* 11/2020 Wong ............... G05B 13/027
2020/0401470 A1\* 12/2020 Jung ............... G06N 7/01

OTHER PUBLICATIONS

Alet et al., "Modular meta-learning in abstract graph networks for combinatorial generalization," 2$^{nd}$ Workshop on Meta-Learning at NeurIPS (2018).
Zhang et al., "Modeling IoT Equipment with Graph Neural Networks," IEEE Access (2019).

\* cited by examiner

NEURAL NETWORKS FOR HANDLING VARIABLE-DIMENSIONAL TIME SERIES DATA

PRIORITY CLAIM

This U.S. patent application claims priority under 35 U.S.C. § 119 to: India Application No. 202021027212, filed on Jun. 26, 2020. The entire contents of the aforementioned application are incorporated herein by reference.

TECHNICAL FIELD

The disclosure herein generally relates to time series data analysis, and, more particularly, to Neural Networks for handling variable-dimensional time series data.

BACKGROUND

Several deep-learning approaches are limited to handling fixed input dimension multivariate time series. Several applications of Internet of Things (IoT) technology involve capturing data from multiple sensors resulting in multi-sensor time series. Existing neural networks-based approaches for such multi-sensor or multivariate time series modeling assume fixed input dimension or number of sensors. Further, such approaches can struggle in the practical settings where different instances of the same device or equipment such as mobile communication devices, wearable devices, engines, etc. come with different combinations of installed sensors. These deep-learning methods are unable to deal with the missing sensor in the device or equipment i.e., available sensors are scarce in a dynamical system.

SUMMARY

Embodiments of the present disclosure present technological improvements as solutions to one or more of the above-mentioned technical problems recognized by the inventors in conventional systems. For example, in one aspect, there is provided a processor implemented method for neural networks-based handling of variable-dimensional time series data. The method comprises obtaining, via one or more hardware processors, one or more multivariate time series data from one or more corresponding sensors deployed in a sub-system; learning via the neural network executed by the one or more hardware processors, for each of the one or more corresponding sensors, a sensor embedding vector based on the one or more multivariate time series data obtained from the one or more corresponding sensors; generating, using the sensor embedding vector learnt for each of the one or more corresponding sensors, via the neural network executed by the one or more hardware processors, one or more conditional vectors based on number of active sensors being identified amongst the one or more corresponding sensors; imputing, via the neural network executed by the one or more hardware processors, for one or more inactive sensors, one or more identified missing dimensions with one or more values into the one or more multivariate time series data to obtain one or more imputed multivariate time series data; and re-configuring one or more internal computations and one or more activations in the neural network corresponding to the one or more imputed multivariate time series data based on the one or more generated conditional vectors to obtain a re-configured neural network.

In an embodiment, the method further comprises estimating, via the re-configured neural network, a target variable corresponding to the one or more imputed multivariate time series data.

In an embodiment, the one or more values for the one or more identified missing dimensions are one of a pre-determined value or an empirically determined value.

In an embodiment, the one or more conditional vectors are generated based on a dimension-wise maximum of the sensor embedding vector learnt for each of the one or more corresponding sensors.

In an embodiment, the method further comprises updating the sensor embedding vector of a specific active sensor based on the sensor embedding vector of remaining active sensors from the number of active sensors.

In yet another aspect, there is provided a system for neural networks-based handling of variable-dimensional time series data. The system comprises a memory storing instructions; one or more communication interfaces; and one or more hardware processors coupled to the memory via the one or more communication interfaces, wherein the one or more hardware processors are configured by the instructions to: obtain one or more multivariate time series data from one or more corresponding sensors deployed in a sub-system; learning via the neural network executed by the one or more hardware processors, for each of the one or more corresponding sensors, a sensor embedding vector based on the one or more multivariate time series data obtained from the one or more corresponding sensors; generating, using the sensor embedding vector learnt for each of the one or more corresponding sensors, via the neural network executed by the one or more hardware processors, one or more conditional vectors based on number of active sensors being identified amongst the one or more corresponding sensors; imputing, via the neural network executed by the one or more hardware processors, for one or more inactive sensors, one or more identified missing dimensions with one or more values into the one or more multivariate time series data to obtain one or more imputed multivariate time series data; and re-configuring one or more internal computations and one or more activations in the neural network corresponding to the one or more imputed multivariate time series data based on the one or more generated conditional vectors to obtain a re-configured neural network.

In an embodiment, the one or more hardware processors are further configured by the instructions to estimate, via the re-configured neural network, a target variable corresponding to the one or more imputed multivariate time series data.

In an embodiment, the one or more values for the one or more identified missing dimensions are one of a pre-determined value or an empirically determined value.

In an embodiment, the one or more conditional vectors are generated based on a dimension-wise maximum of the sensor embedding vector learnt for each of the one or more corresponding sensors.

In an embodiment, the one or more hardware processors are further configured by the instructions to update the sensor embedding vector of a specific active sensor based on the sensor embedding vector of remaining active sensors from the number of active sensors.

In yet another aspect, there is provided a computer program product comprising a non-transitory computer readable medium having a computer readable program embodied therein, wherein the computer readable program, when executed on a computing device causes the computing device to obtain one or more multivariate time series data from one or more corresponding sensors deployed in a sub-system; learning via a neural network executed by one or more hardware processors, for each of the one or more corresponding sensors, a sensor embedding vector based on the multivariate time series data obtained from the one or more corresponding sensors; generating, using the sensor embedding vector learnt for each of the one or more corresponding sensors, via the neural network executed by the one or more hardware processors, one or more conditional vectors based on number of active sensors being identified amongst the one or more corresponding sensors; imputing, via the neural network executed by the one or more hardware processors, for one or more inactive sensors, one or more identified missing dimensions with one or more values into the one or more multivariate time series data to obtain one or more imputed multivariate time series data; and re-configuring one or more internal computations and one or more activations in the neural network corresponding to the one or more imputed multivariate time series data based on the one or more generated conditional vectors to obtain a re-configured neural network.

In an embodiment, the computer readable program, when executed on the computing device further causes the computing device to estimate, via the re-configured neural network, a target variable corresponding to the one or more imputed multivariate time series data.

In an embodiment, the one or more values for the one or more identified missing dimensions are one of a pre-determined value or an empirically determined value.

In an embodiment, the one or more conditional vectors are generated based on a dimension-wise maximum of the sensor embedding vector learnt for each of the one or more corresponding sensors.

In an embodiment, the computer readable program, when executed on the computing device further causes the computing device to update the sensor embedding vector of a specific active sensor based on the sensor embedding vector of remaining active sensors from the number of active sensors.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Multi-sensor time series data is ubiquitous and growing at a rapid pace owing to the increasing ambit of devices under the Internet of Things technology. In the past few years, deep learning approaches have been successfully explored for applications (e.g., IoT applications) in multivariate time series forecasting, classification, anomaly detection, and remaining useful life estimation. However, most existing approaches for multivariate time series data assume a fixed-dimensional time series as input. In many practical settings, such an assumption may not hold. For instance, when learning activity recognition models, time series from different people may involve a varying number of available sensors/active sensors (such as accelerometer, gyroscope, magnetometer, and the like) owing to different wearable or mobile devices. Similarly, equipment health monitoring models must be dealt with data from different equipment instances with varying set of sensors (such as temperature, vibration, pressure, and the like) installed on them.

In the present disclosure, systems and methods described herein consider the setting where multiple multivariate time series are generated from different instances of the same underlying dynamical system (e.g., humans in activity recognition, or engines in equipment health monitoring), with different instances having a different combination of available sensors (also referred as active sensors). A simple approach to deal with a missing sensor in a time series instance is to assume a constant value (e.g., mean/average value) for that sensor based on the statistics from other time series instances where the sensor is available. It is empirically shown that the performance of such an approach degrades rapidly as the percentage of missing sensors in the test instance increases. Furthermore, many conventional approaches dealing with missing values in a time series, are not directly applicable in this setting as they rely on availability of at least one value for each dimension in the time series.

Another approach is to train a different network for each possible combination of available sensors/active sensors, which 1) is not scalable as the number of possible combinations grows exponentially, 2) assumes availability of sufficient training data for each combination, and 3) does not retain any knowledge across combinations. Embodiments of the present disclosure provide systems and methods that implement a neural network architecture with a core module that models the temporal aspect of the data while another module (e.g., a conditioning module) that adjusts the core module based on the combination of sensors available in each time series, effectively exhibiting different behavior depending on the available sensors/active sensors. Based on empirical evaluation on two activity recognition datasets and a prognostics dataset, it is experimentally shown the method of the present disclosure outperforms baseline approach(es) which uses mean-imputation for the missing sensors in two settings: i) zero-shot setting where the combination of available sensors/active sensors at test time is different from any of the combinations in the training set, ii) fine-tuning setting: where along with the fixed training set with different combinations, a small number of instances for the same combination as that of the test instance are available for finetuning.

It is noted by the present disclosure that most dynamical systems have a well-documented and readily accessible underlying structure capturing the inter-dependencies between sub-systems. Deep learning models such as those based on recurrent neural networks (RNNs) or convolutional neural networks (CNNs) fail to explicitly leverage this potential knowledge into the learning procedure. In the present disclosure, the systems and methods associated therein consider two modules: one based on Gated Graph Neural Networks (GGNNs) as a core module which allows capturing the knowledge of the structure of a complex system to model the multi-sensor time series data as a graph, while other module is based on (Gated) RNNs if dynamical system structure is not known.

On the other hand, literature on the problem of handling variable-dimensional input in multivariate time series is scarce. Though several approaches in the neural networks literature deal with the problem of varying dimensionality, most of these are primarily restricted to studying variability along the time dimension or the pixel space in images and videos, where these are naturally handled, e.g., via recurrent neural networks (e.g., refer 'Sepp Hochreiter and J¨urgen Schmidhuber. Long short-term memory. Neural computation, 9(8):1735-1780, 1997.') for the time dimension, and variants of pooling operations for the image applications (e.g., refer 'Kaiming He, Xiangyu Zhang, Shaoqing Ren, and Jian Sun. Spatial pyramid pooling in deep convolutional networks for visual recognition. IEEE transactions on pattern analysis and machine intelligence, 37(9):1904-1916, 2015.').

A neuro-evolutionary approach was also proposed by ElSaid et al., 2020 (e.g., refer 'AbdElRahman ElSaid, Joshua Karnas, Zimeng Lyu, Daniel Krutz, Alexander G Ororbia, and Travis Desell. Neuro-evolutionary transfer learning through structural adaptation. In International Conference on the Applications of Evolutionary Computation (Part of EvoStar), pages 610-625. Springer, 2020.') which studied the problem of structure-adaptive transfer learning for time-series prediction. It relies on a series of mutation operations and cross-over (reproduction) operations over the neural units. Instead of the computationally expensive neuro-evolutionary approaches such as the above, the present disclosure takes a different perspective on the problem of adapting to varying dimensionality where graph neural networks (GNNs) are used to achieve combinatorial generalization. Such generalization ability in GNNs has been recently studied in different contexts, e.g., for learning structured reinforcement learning (RL) policies where the same nodes in the GNN can be re-used as modules to learn RL agents with different overall graph structure. For instance, NerveNet (e.g., refer 'Tingwu Wang, Renjie Liao, Jimmy Ba, and Sanja Fidler. Nervenet: Learning structured policy with graph neural networks. 2018.') shows the ability of GNNs to transfer knowledge from a four-legged robot to a six-legged robot.

Further, recent work on Modular Universal Reparameterization (MUiR) by Meyerson and Miikkulainen, 2019 (e.g., refer 'Elliot Meyerson and Risto Miikkulainen. Modular universal reparameterization: Deep multitask learning across diverse domains. In Advances in Neural Information Processing Systems, pages 7901-7912, 2019.') attempted to learn core neural modules which can be transferred across varying input and output dimensions. It proposed learning the core module by solving several sets of architecture-task problems with varying input and output dimensionality. However, MUiR does not study multivariate time series setting and relies on solving several tasks to learn the core neural module. Instead, the present disclosure relies on a conditioning vector obtained via GNNs to allow adaptability to varying input dimensions.

Recently proposed CondConv of [Yang et al., 2019] (e.g., refer 'Brandon Yang, Gabriel Bender, Quoc V Le, and Jiquan Ngiam. Condconv: Conditionally parameterized convolutions for efficient inference. In Advances in Neural Information Processing Systems, pages 1305-1316, 2019.') is similar in spirit to embodiments of the present disclosure, i.e. it attempts to dynamically adapt the parameters of the neural network conditioned on the current input. While it focuses on adapting to each input with same dimensionality, the present disclosure focuses on adapting to inputs of varying dimensionality. Though significantly different in implementation and the end-objective, the method of the present disclosure draws inspiration from such conventional works, including [Rosenbaum et al., 2019; Andreas et al., 2016] (e.g., refer 'Clemens Rosenbaum, Ignacio Cases, Matthew Riemer, and Tim Klinger. Routing networks and the challenges of modular and compositional computation. arXiv preprint arXiv:1904.12774, 2019.', where the parameters of the core neural network are dynamically adjusted as per the input' and 'Jacob Andreas, Marcus Rohrbach, Trevor Darrell, and Dan Klein. Neural module networks. In Proceedings of the IEEE Conference on Computer Vision and Pattern Recognition, pages 39-48, 2016.'), where the parameters of the core neural network are dynamically adjusted as per the input.

Handling variable input dimensionality can be a harder case for the missing value problem in time series. Several approaches for handling missing values in multivariate time series via neural networks have been proposed. For instance, Che et al., 2018 (e.g., refer 'Zhengping Che, Sanjay Purushotham, Kyunghyun Cho, David Sontag, and Yan Liu. Recurrent neural networks for multivariate time series with missing values. Scientific reports, 8(1):6085, 2018.') studied missing value problem in multivariate time series by proposing a variant of the gated recurrent units of Cho et al., 2014 (e.g., refer 'Kyunghyun Cho, Bart Van Merri" enboer, Caglar Gulcehre, Dzmitry Bandanau, Fethi Bougares, Holger Schwenk, and Yoshua Bengio. Learning phrase representations using RNN encoder-decoder for statistical machine translation. arXiv preprint arXiv:1406.1078, 2014.') using knowledge of which dimensions of the input are missing and for how long. Such approaches are, however, not directly applicable in setting(s) of the system of the present disclosure where one or more dimensions of the time series are completely missing, i.e., the missing percentage is 100%, since they rely on one or more past values to adapt.

Several transfer learning and gradient-based meta learning approaches [Malhotra et al., 2017; Fawaz et al., 2018; Kashiparekh et al., 2019; Narwariya et al., 2020] (e.g., refer 'Pankaj Malhotra, Vishnu TV, Lovekesh Vig, Puneet Agarwal, and Gautam Shroff. Timenet: Pre-trained deep recurrent neural network for time series classification. In Proceedings of the European Symposium on Artificial Neural Networks, Computational Intelligence and Machine Learning (ESANN), 2017.', 'Hassan Ismail Fawaz, Germain Forestier, Jonathan Weber, Lhassane Idoumghar, and Pierre-Alain Muller. Transfer learning for time series classification. arXiv preprint arXiv:1811.01533, 2018.', 'Kathan Kashiparekh, Jyoti Narwariya, Pankaj Malhotra, Lovekesh Vig, and Gautam Shroff. Convtimenet: A pre-trained deep convolutional neural network for time series classification. In Neural Networks (IJCNN), 2019 International Joint Conference on. IEEE, 2019.', and 'Jyoti Narwariya, Pankaj Malhotra, Lovekesh Vig, Gautam Shroff, and TV Vishnu. Meta-learning for few-shot time series classification. In Proceedings of the 7$^{th}$ ACM IKDD CoDS and 25th COMAD, pages 28-36. 2020.' Respectively) have been recently proposed for time-series classification. However, they studied the problem of quickly adapting to new classes of interest or new domains in the univariate setting, and do not address the problem of varying-dimensional multivariate time series.

More specific to the activity recognition task, conventional approach of Wang et al., 2018a (e.g., refer 'Jindong Wang, Yiqiang Chen, Lisha Hu, Xiaohui Peng, and S Yu Philip. Stratified transfer learning for cross domain activity recognition. In 2018 IEEE International Conference on Pervasive Computing and Communications (PerCom), pages 1-10. IEEE, 2018.') proposed a transfer learning approach called Stratified Transfer Learning (STL) for cross-domain activity recognition. The source and target domains are the body parts of the same person or different person, e.g., transfer knowledge from left arm to right arm, right arm to the torso, etc. This approach considered knowledge transfer based on the similarity of installed sensors on body parts. On the other hand, method of the present disclosure considers transferring knowledge to different combinations of sensors and is therefore, orthogonal in nature to STL. Heterogeneous transfer learning has been studied in activity recognition of Feuz and Cook, 2015 (e.g., refer 'Kyle D Feuz and Diane J Cook. Transfer learning across feature-rich heterogeneous feature spaces via feature-space remapping (FSR). ACM Transactions on Intelligent Systems and Technology (TIST), 6(1):1-27, 2015.'), where the idea was to learn a mapping of sensors from the source domain to those in the target domain when the meta-data related to sensors is unknown restricting easy mapping of dimensions across datasets. This setting is orthogonal to setting of the present disclosure.

Figure 1:
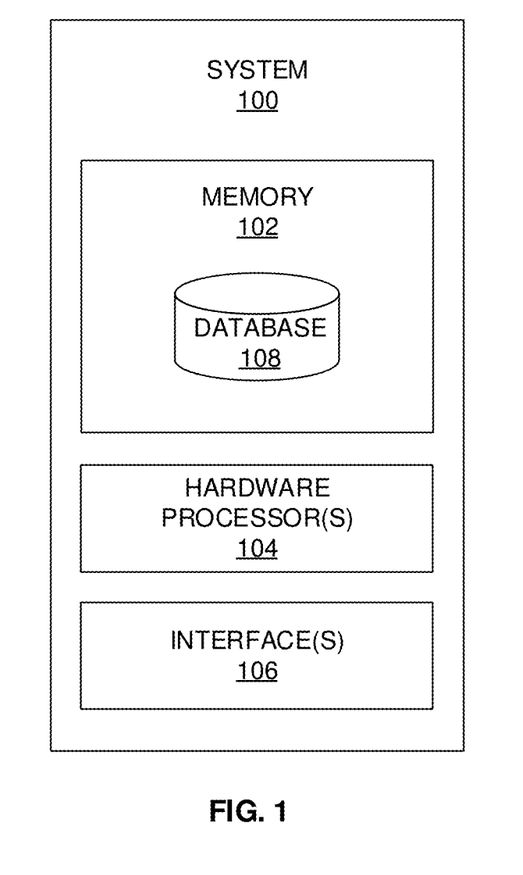
FIG. 1 depicts a system for handling variable dimension multivariate time series, in accordance with an embodiment of the present disclosure.
Figure 2:
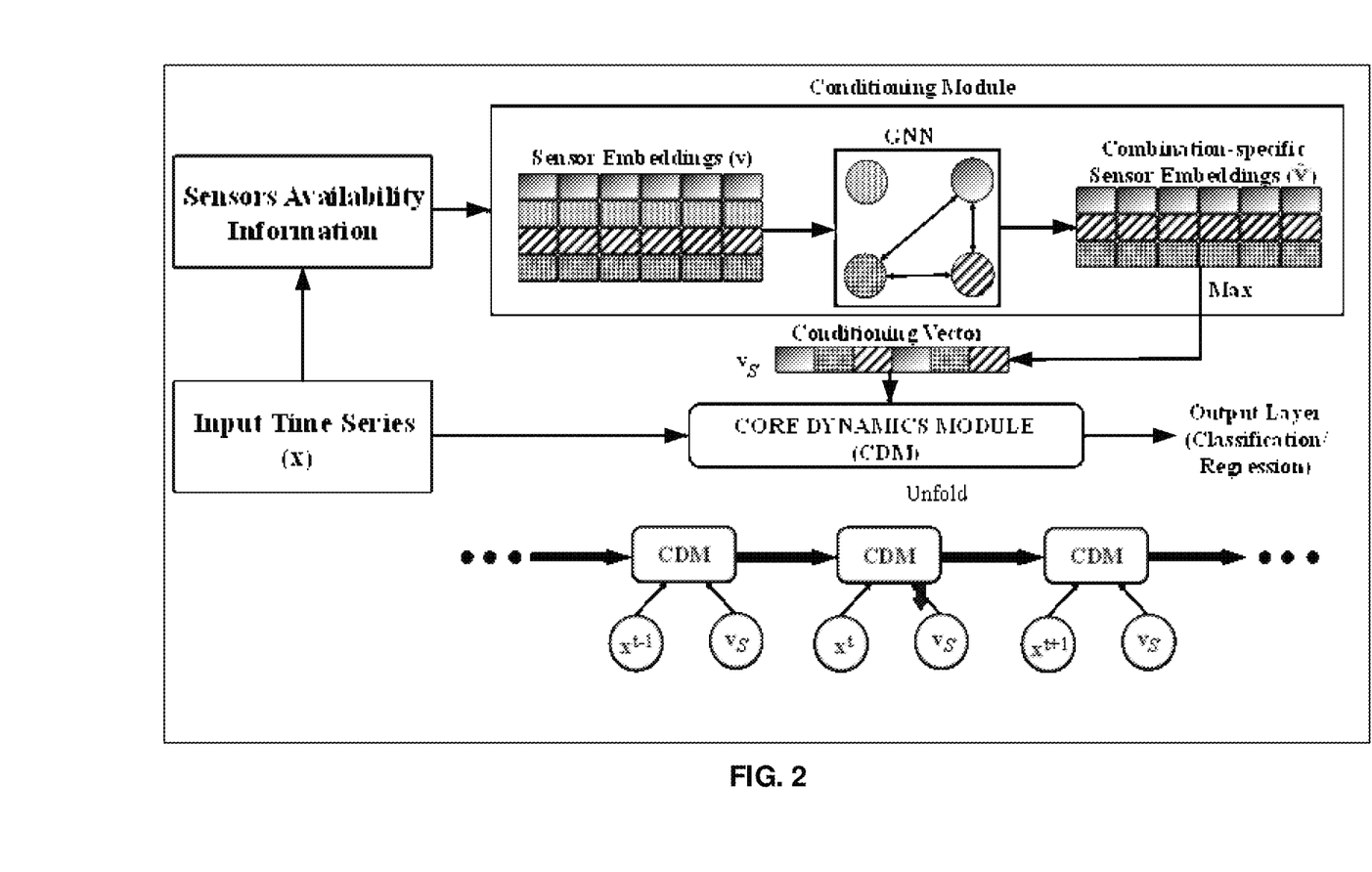
FIG. 2 illustrates an exemplary architecture of the system of FIG. 1 for handling variable dimension multivariate time series, in accordance with an embodiment of the present disclosure.
Figure 3:
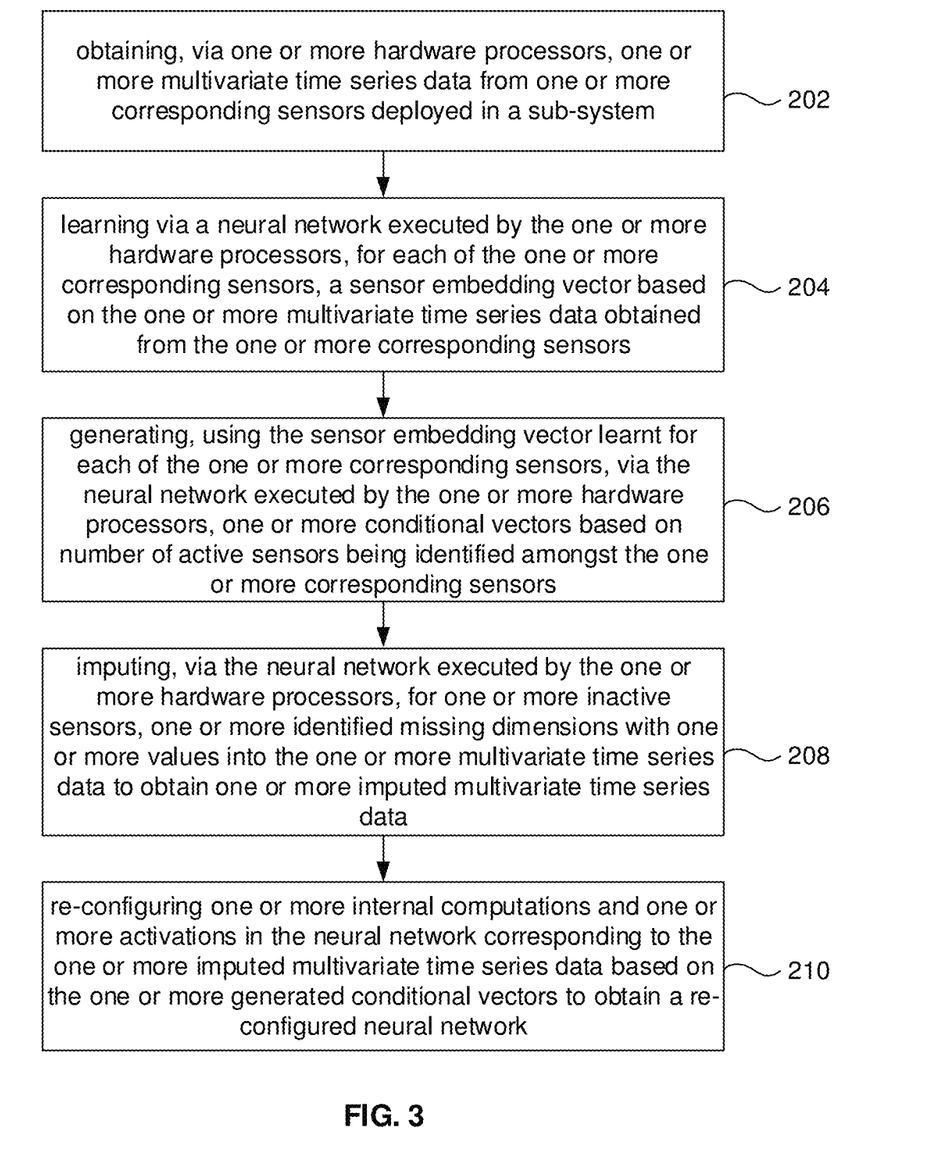
FIG. 3 depicts a flow-diagram illustrating a method for handling variable dimension multivariate time series, using the system of FIG. 1, in accordance with an embodiment of the present disclosure.

Referring now to the drawings, and more particularly to FIGS. 1 through 3, where similar reference characters denote corresponding features consistently throughout the figures, there are shown preferred embodiments and these embodiments are described in the context of the following exemplary system and/or method.

FIG. 1 depicts a system 100 for handling variable dimension multivariate time series, in accordance with an embodiment of the present disclosure. In an embodiment, the system 100 is referred as a 'neural network system' and may be interchangeably used herein. The system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices (e.g., mobile communication device such as smart phones, tablet/tablet computer), workstations, mainframe computers, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises data obtained from sensors, wherein the sensors are either external or internal to a sub-system (e.g., vehicle, engine, mobile communication devices, and the like). The memory 102 comprises a conditioning module, and a core dynamics module (CDM) as depicted in FIG. 2. Additionally, the memory 102 stores one or more multivariate time series data obtained from sensors connected to one or more sub-systems (e.g., examples of sub-systems are described in later section). The memory 102 further stores (i) how a sensor embedding vector is learnt by a neural network comprised in the system, based on the one or more multivariate time series data obtained from the one or more corresponding sensors, (ii) one or more conditional vectors generated based on number of available/active sensors being identified amongst the one or more corresponding sensors, (iii) information on The memory 102 further comprises (or may further comprise) information pertaining one or more identified missing dimensions the one or more multivariate time series data and how the one or more identified missing dimensions are imputed with one or more values, and (iv) how one or more internal computations and one or more activations are re-configured in the neural network. Further, the memory 102 stores target variable being estimated corresponding to the one or more imputed multivariate time series data. The memory 102 further stores updated sensor embedding vector of each specific active sensor based on the sensor embedding vector of remaining active sensors. Moreover, the memory 102 stores input(s)/output(s) of each step performed by the systems and methods of the present disclosure. In other words, input(s) fed at each step and output(s) generated at each step are comprised in the memory 102 and can be utilized in further processing and analysis.

FIG. 2, with reference to FIG. 1, illustrates an exemplary architecture of the system 100 for handling variable dimension multivariate time series, in accordance with an embodiment of the present disclosure. The problem and approach of the present disclosure are defined below as illustrative examples and shall not be construed as limiting the scope of the present disclosure.

PROBLEM DEFINITION

Consider a training set $\mathcal{D} = \{(x_i, y_i)\}_{i=1}^{N}$ having N multivariate time series $x_i \in \mathcal{X}$ with an associated target (or target variable) $y_i \in \mathcal{Y}$. Each time series $x_i = \{x_i^t\}_{t=1}^{T_i}$ has length $T_i$ with $x_i^t \in \mathbb{R}^{d_i}$, where $1 \leq d_i \leq d$ is the number of available dimensions or sensors out of a total of d sensors. Further, let S denote the set of all the sensors. Then, the $d_i$ dimensions for the i-th time series correspond to a subset of sensors $S_i \subseteq S$, with $|S_i|=d_i$ and $|S|=d$. The goal is to learn a mapping $f: \mathcal{X} \rightarrow \mathcal{Y}$. Note that this setting is different from the standard multivariate time series modeling setting in the sense that the input dimension $d_i$ is allowed to vary across the time series in $\mathcal{D}$. When d is reasonably large, the subsets of S available across time series in $\mathcal{D}$ tends to be much smaller than the set of all possible combinations, and therefore, good generalization at test time requires learning a function that provides robust estimates beyond the combinations of sensors seen in $\mathcal{D}$.

Though easily extendable to other applications of multivariate time series modeling, two tasks are considered in the present disclosure, for example, i) classification (for activity recognition), and ii) regression (for remaining useful life estimation). For the K-way classification tasks, target $y_i$ corresponds to one of the K classes $\{1, \ldots, K\}$ When using neural networks as approximators for f, $y_i \in \{0,1\}^K$ is represented as a one-hot vector, with value being 1 for the dimension corresponding to the target class, and 0 for the remaining K-1 dimensions. For activity recognition, the K classes correspond to K different activities. For the regression task, $y_i \in \mathbb{R}$; in case of remaining useful life (RUL) estimation, $y_i = F_i - T_i$, where $F_i$ denotes the total operational life of an equipment instance i till it fails, with $1 \leq T_i \leq F_i$.

Approach:

The method of the present disclosure represents each point $x_i^t$ in $\mathbb{R}^d$ irrespective of the number of available sensors/active sensors $d_i$, where the unavailable sensors (also referred as inactive sensors) are mean-imputed, i.e., the mean value of the sensor across other instances where it is available is used. This allows the system 100 of the present disclosure to input a fixed-dimensional time series to a core module that captures temporal patterns or dynamics in the data. Along with this core module, an additional conditioning module is provisioned which accounts the sensors available in a particular time series and generates a conditioning vector that accordingly alters the processing of the core module.

More specifically, system and method of the present disclosure consists of the following two modules, as illustrated in FIG. 2. As depicted in FIG. 2, a core dynamics module (CDM) which is either a gated graph neural network (if system has well-defined structure) or a (gated) recurrent neural network wherein when the core dynamics module is executed by the one or more hardware processors 104 learns the dynamics of the system (e.g., the system 100 or a sub-system, wherein the sub-system is either a standalone system or an integral part of the system 100) and ingests a fixed-dimensional multivariate time series where the missing dimensions are imputed with a constant (mean) value. A conditioning module when executed by the one or more hardware processors 104 generates a "conditioning vector" as a function of the available sensors/active sensors irrespective of the readings those sensors take for a specific time series instance. This conditioning vector is passed as an additional input to the core dynamics module allowing it to adjust its internal computations and activations according to the combination of available sensors/active sensors. The conditioning vector is in-turn obtained from "sensor embedding vectors" via a graph neural network. Note that the core dynamics module and the conditioning module along with the sensor embeddings are jointly learned in an end-to-end fashion via stochastic gradient descent (SGD). Internal computations refer to the processing of the imputed multivariate time series data and the conditioning vector via the different layers of the neural network, in one example embodiment. Activations refer to output of various units of the neural network, in one example embodiment. The above description is better understood by way of following illustrative example:

Say there are total 4 dimensions and 10 time series instances. In the 1st time series instance, the 2nd dimension values are missing, while it is present in all other time series.

Conditioning Module: The sensor embedding vector of size where '$d_i$', is the time series instances that is constructed for each 4 dimensions. A graph neural network is then constructed using active dimension say 1st, $3^{rd}$ and 4th in 1st time series instance in which node represents sensor embedding and edges represents the connection between nodes. The max pool is then on the output of graph neural network to obtain conditioning vector of '$d_i$' dimension.

Time series: To compute fixed-dimension time series, the 2nd dimension value for 1st time series instance is computed from mean value of 2nd dimension present in rest of time series instances. Now, the output of conditioning module which is conditioning vector and fixed-dimension time series are input to core dynamics module, which is gated recurrent network that learns features according with the combination of available sensors/active sensors. All the learning is in an end-to-end fashion.

Each sensor is associated with a vector or embedding, and the vectors for any given combination of available sensors/active sensors in a time series are used to obtain the combination-specific conditioning vector. This is equivalent to mapping a set of (sensor) vectors to another (conditioning) vector. Though the core module based on RNNs can only ingest fixed-dimensional time series input, the conditioning vector can be obtained by summarizing a variable number of sensor vectors via a GNN. This conditioning vector serves as an additional input that allows the core module to adjust its processing according to the variable number of available sensors/active sensors within each time series. A key advantage of using a GNN for processing the combination of sensors is that once the GNN is learned, it can process any previously unseen combination of sensors apart from those seen during training, thus depicting combinatorial generalization.

FIG. 3, with reference to FIGS. 1 through 2, depicts a flow-diagram illustrating a method for handling variable dimension multivariate time series, using the system 100 of FIG. 1, in accordance with an embodiment of the present disclosure. In an embodiment, the system 100 comprises one or more data storage devices or the memory 102 operatively coupled to the one or more hardware processors and are configured to store instructions for execution of steps of the method by the one or more processors 104. The steps of the method of the present disclosure will now be explained with reference to components of the system 100 of FIG. 1, FIG. 2, the flow diagram as depicted in FIG. 3. In an embodiment, at step 202 of the present disclosure, the one or more hardware processors 104 obtain, as an input, one or more multivariate time series data from one or more corresponding sensors deployed in a sub-system (e.g., sub-systems such as vehicle, mobile communication device, wearable devices, engines, and the like).

In an embodiment of the present disclosure, at step 204, a sensor embedding vector is learnt for each of the one or more corresponding sensors, based on the one or more multivariate time series data obtained from the one or more corresponding sensors. The sensor embedding vector is learnt via the neural network executed by the one or more hardware processors 104.

In an embodiment of the present disclosure, at step 206, one or more conditional vectors are generated based on number of active sensors being identified amongst the one or more corresponding sensor. More specifically, one or more conditional vectors are generated using the sensor embedding vector learnt for each of the one or more corresponding sensors, via the neural network executed by the one or more hardware processors 104. For instance, each sensor s∈S is associated with a learnable embedding vector $v_s \in \mathbb{R}^{d_s}$. Corresponding to the set of sensors S, a graph $\mathcal{G}$(V, ε) with nodes or vertices V and edges ε, with one node $v_s \in V$ for every s∈S such that |V|=|S| is considered. The neighbors of any node $v_s$ are denoted by $\mathcal{N}_\mathcal{G}(v_s)$.

For a specific combination $S_i \subseteq S$, only the nodes $V_i \subseteq V$ corresponding to the sensors in $S_i$ are considered to be active, and these contribute to obtaining the combination-specific conditioning vector $v_{S_i}$. For the active nodes, the graph is assumed to be fully-connected such that each active node in the graph is connected to every other active node. As depicted in FIG. 2, any edge is active only if both the participating nodes are active.

The GNN corresponding to this graph consists of a node specific feed-forward network $f_n$ and an edge-specific feed-forward network $f_e$; $f_n$ and $f_e$ are shared across the nodes and edges in the graph, respectively. For any active node $v_k \in V_i$, the node vector $v_k$ is updated using the GNN as follows:

$$u_{kl} = f_e([v_k, v_l]; \theta_e), \forall v_l \in \mathcal{N}_\mathcal{G}(v_k) \quad (1)$$

$$\tilde{v}_k = f_n([v_k, \Sigma_{\forall l} v_{kl}]; \theta_n) \quad (2)$$

where $f_e$ and $f_n$ both consist of leaky ReLU layers with learnable parameters $\theta_e$ and $\theta_n$, respectively. In the present disclosure, the systems and methods also use dropout after these layers for regularization. While $f_e$ computes the message from node $v_l$ to $v_k$, $f_n$ updates the node vector $v_k$ to $\tilde{v}_k$ using the aggregated message from its neighboring nodes. Equations (1) and (2) depict updating of the sensor embedding vector of a specific active sensor based on the sensor embedding vector of remaining active sensors from the number of active sensors.

Finally, the conditioning vector $v_{S_i} \in \mathbb{R}^{d_s}$ specific to a combination of sensors is obtained from the updated node vectors as:

$$v_{S_i} = \max(\{\tilde{v}_k\} v_k \in V_i) \quad (3)$$

where max returns the dimension-wise maximum value across the updated node vectors for the specific combination of sensors $S_i$. It is noteworthy that the summation over the messages across nodes in equation (2) and the max operation in equation (3) essentially provide the desired ability to process varying number of nodes (sensors) in the conditioning module. As can be observed from equation (3), the one or more conditional vectors are generated based on a dimension-wise maximum of the sensor embedding vector learnt for each of the one or more corresponding sensors.

In an embodiment of the present disclosure, at step 208, one or more identified missing dimensions are imputed with one or more values into the one or more multivariate time series data to obtain one or more imputed multivariate time series data. The one or more identified missing dimensions are imputed for one or more inactive sensors, via the neural network executed by the one or more hardware processors 104. The one or more values for the one or more identified missing dimensions (that are to be (or being imputed) are one of a pre-determined value or an empirically determined value, in one example embodiment of the present disclosure. For instance, as mentioned above, each point $x_i^t$ in $\mathbb{R}^d$ irrespective of the number of available sensors/active sensors $d_i$, where the unavailable sensors are mean-imputed, i.e., the mean value of the sensor across other instances where it is available is used. For example, say there are total 4 dimensions and 10 time series instances. If the 2nd dimension is missing in 4th time series instance, and available in all other time series instances, then the $2^{nd}$ dimension of 4th time series instance can be computed with the mean value of the reading for the 2nd dimension in the rest of the 9 time series instances. Though the present disclosure described use of mean values (or average values for performing imputation, such example shall not be construed as limiting the scope of the present disclosure and any other value (other than mean value) may be used for imputing the one or more identified missing dimensions. This allows the system of the present disclosure to input a fixed-dimensional time series to a core module that captures temporal patterns or dynamics in the data. Along with this core module, an additional conditioning module is provisioned which takes into account the sensors available in a specific time series and generates a conditioning vector that accordingly alters the processing of the core module.

Referring to steps of FIG. 3, in an embodiment of the present disclosure, at step 210, one or more internal computations and one or more activations are re-configured in the neural network corresponding to the one or more imputed multivariate time series data based on the one or more generated conditional vectors to obtain a re-configured neural network. The above step 210 is better understood by way of the following description illustrated by an example and such example shall not be construed as limiting the scope of the present disclosure.

Any time series $x_i \in \mathcal{D}$ is first converted to the d-dimensional time series $\tilde{x}_i$ with mean-imputation for the unavailable sensors. This time series along with its conditioning vector $v_{S_i}$ are processed by the core dynamics model as follows:

$$z_i^t = GRU([\tilde{x}_i^t, v_{S_i}], z_i^{t-1}; \theta_{GRU}) t: 1, \ldots, T_i \quad (4)$$

$$\hat{y}_i = f_o(z_i^{T_i}, \theta_o) \quad (5)$$

where GRU is a (multi-layered) GRU-based RNN as known in the art having $\theta_{GRU}$ learnable parameters that gives feature vector $z^{T_i}$ at the last time step $T_i$. At last, the estimate $\hat{y}_i$ for $y_i$ is obtained via $f_o$ consisting of ReLU layer(s) followed by softmax or sigmoid layer depending upon whether the task is classification or regression, respectively, such that $\hat{y}_i \in [0,1]^K$ in case of classification, and $\hat{y}_i \in \mathbb{R}$ in case of regression. For the RUL estimation regression task, system and method use min-max normalized target variables (also referred as 'target') such that they lie in [0, 1]. In other words, a target variable corresponding to the one or more imputed multivariate time series data is estimated via the re-configured neural network.

A scenario is considered by the system and method of the present disclosure where complex system has a well-defined structure. To capture the knowledge of the underlying structure, a gated graph neural network is used as a Core Dynamics Module (CDM) by the embodiments of the present disclosure.

Any time series of the complex system is represented as $x_i \in \mathcal{D}$ using a directed graph $\mathcal{G}_{CDM} = (V_{CDM}, \varepsilon_{CDM})$ that consists of multiple sub-systems $v_j \in V_{CDM}$ connected to each other in a known fashion with edge $e_{jk} = (v_j, v_k) \in \varepsilon_{CDM}$ (for j=1, ... |$V_{CDM}$|) is a node in the graph that corresponds to a subset of sensors $S_i \subset S$ associated with the module indexed by j, $e_{jk} = (v_j, v_k) \in \varepsilon_{CDM}$ is a directed edge from node $v_j$ to $v_k$ that models the influence of $S_k$ on $S_j$. Effectively, the multivariate time series $x_i$ of sensor data is then represented in the graph domain using $|V_{CDM}|$ nodes such that each node $v_j$ has $|S_j|$ dimensional multivariate time-series $x_{i,j}$.

As mentioned earlier, any time series $x_i \in \mathcal{D}$ is first converted to the d-dimensional time series $\tilde{x}_i$ with mean-imputation for the unavailable sensors. Each multivariate time series $x_{i,j}$ along with its conditioning vector $v_{S_i}$ is processed by a node-specific neural network $M_j$ (for $j=1, \ldots, |V_{CDM}|$) to obtain a fixed-dimensional initial node representation vector $v_{i,j}^0$. This initial representation $v_{i,j}^0$ is then updated using the representations of neighboring nodes defined by $\mathcal{G}_{CDM}$ via shared gated RNNs denoted as GRUs and edge-specific feed-forward network $f_{jk}$ and obtained $v_{i,j}^\tau$ as follows.

$$v_{i,j}^{0,t} = M_j([x_{i,j}, v_{S_i}], v_{i,j}^{0,t-1}; \theta_{M_j}), t:1, \ldots, T_i \quad (6)$$

Let $v_{i,j}^0 = v_{i,j}^{0,T_i}$ (7)

$$p_{kj}^m = f_{kj}(v_{i,k}^{m-1}; \theta_{kj}), p_{jk}^m = f_{jk}(v_{i,j}^{m-1}; \theta_{jk}) \quad (8)$$

$$P_{1j}^m = [p_{1j}^m \ldots p_{|v_{CDM}|j}^m]^T, P_{2j}^m = [p_{j1}^m \ldots p_{j|v_{CDM}|}^m]^T \quad (9)$$

$$a_{i,j}^m = [A_{j:}^{in} P_{1j}^m, A_{j:}^{out} P_{2j}^m]^T \quad (10)$$

$$v_{i,j}^m = GRU_S(a_{i,j}^m, v_{i,j}^{m-1}; \theta GRU_j) \quad (11)$$

where $M_j$ is a small feed-forward network followed by Gated Recurrent Unit (GRU) network having learnable parameters $\theta_{M_j}$ that gives fixed-dimensional representation for each node $v_j \in |V_{CDM}|$. Here, $j,k=1, \ldots, |V_{CDM}|$, $m(=1, \ldots \tau)$ denotes message propagation steps, $A_{j:}^{in}$ and $A_{j:}^{out}$ denote the j-th row of $A^{in}$ and $A^{out}$, respectively. Where $A^{in}$ allows to capture information from upstream nodes in the system and $A^{out}$ allows to capture information from downstream nodes. $f_{jk}$ denotes feedforward ReLU layer(s) with parameters $\theta_{jk}$ that computes the contribution (message) from $v_j$ to $v_k$ if there is an incoming edge from $v_j$ to $v_k$, i.e. when $e_{jk} \in \varepsilon_{CDM}$. Then, $p_{kj}^m \in \mathbb{R}^d$ denotes the message from $v_j$ to $v_k$ corresponding to edge $e_{jk}$. Similarly, $f_{kj}$ also have feedforward ReLU layer(s) with parameters $\theta_{kj}$ that computes the message from $v_k$ to $v_j$ if there is an outgoing edge from $v_j$ to $v_k$, i.e. when $e_{jk} \in \varepsilon_{CDM}$. $P_{1j}^m$ and $P_{2j}^m \in \mathbb{R}^{|v_{CDM}| \times d}$ denote the matrices that contain the information from the incoming and outgoing edges with $v_j$ as starting and ending node, respectively. For $e_{jk} \notin \varepsilon_{CDM}$, $f_{jk}$ simply returns $0 \in \mathbb{R}^{d'}$. At last, $GRU_S$ is a GRU-based RNN network having shared $\theta_{GRU_S}$ across all nodes of $\mathcal{G}_{CDM}$ that gives feature vector for all node $v_j \in V_{CDM}$.

The final representations $v_{i,1}^\tau, \ldots, v_{i,|V_{CDM}|}^\tau$ can be aggregated to get a graph-level output $\hat{y}_i$ by using an attention mechanism, e.g., as used in Li et al., 2015 (e.g., refer 'Yujia Li, Daniel Tarlow, Marc Brockschmidt, and Richard Zemel. Gated graph sequence neural networks. arXiv preprint arXiv:1511.05493, 2015.'). In the present disclosure, a simple variant of this attention mechanism is considered as: for each node, the concatenated vector $\tilde{v}_{i,j} = [v_{i,j}^0, v_{i,j}^\tau, \text{node\_type}_j]$ is used as inputs to two parallel feedforward layers $f_1$ and $f_2$ to obtain $f_1(v_{i,j}^\tau) \in \mathbb{R}$ and $\hat{y}_{i,j} = f_2(v_{i,j}^\tau) \in \mathbb{R}$. Here, node\_type$_j$ is a one-hot vector of length $|V_{CDM}|$, and is set to 1 for jth position, and 0 otherwise. Softmax is applied over the values from $f_1$ to obtain attention weight $$w_j = \frac{\exp(f_1(\tilde{v}_{i,j}^\tau))}{\sum_i \exp(f_1(\tilde{v}_{i,j}^\tau))}$$

for node $v_j$. The final estimated output is then given by $$\hat{y}_i = \sum_{j=1}^{|v|CDM} w_j \hat{y}_{i,j} \quad (12)$$

This can be interpreted as assigning a weightage $0 \leq w_j \leq 1$ to the node $v_j$ while $\hat{y}_{i,j} = f_2(\tilde{v}_{i,j}^\tau)$ denotes the estimated output as per node $v_j$. Here, $f_1$ consists of feed-forward networks with leaky ReLU units and $f_2$ consists of Leaky ReLU layer(s) followed by softmax or sigmoid layer depending upon task whether it is classification or regression.

Training Objectives:

Cross-entropy $\mathcal{L}_c$ and squared-error $\mathcal{L}_r$ losses are used as training objectives for the classification and regression tasks, respectively:

$$\mathcal{L}_c = -\frac{1}{N}\sum_{i=1}^{N}\sum_{k=1}^{K} y_i^k \log(\hat{y}_i^k) \quad (13)$$

$$\mathcal{L}_r = \frac{1}{N}\sum_{i=1}^{N}(y_i - \hat{y}_i)^2 \quad (14)$$

where $y_i^k$ denotes the k-th dimension of $y_i$, etc. All the parameters $\theta_n$, $\theta_e$, the vectors $v_s$ for all $s \in S$, $\theta_{GRU}$, and $\theta_0$ are learned via mini-batch SGD. In practice, time-series with the same set of available sensors/active sensors within a mini-batch is considered such that the active nodes in $\mathcal{G}$ for all the time series in a mini-batch are the same.

Example for the steps 202 till 210 is illustrated herein. Suppose there is an ideal engine with all necessary installed sensors which can predict condition of engine accurately. The installed sensors include such as pressure gauge, engine oil meter, tire-pressure monitor, engine control unit (ECU) sensors, throttle sensors, air-conditioner sensors, and the like. If some sensors combination out of these available sensors/active sensors are missing, then the prediction performance degrades. Suppose there is Engine 1 and Engine 2 both are having different combination of available sensors/active sensors. The neural network comprised in the system 100 is trained by injecting fixed-dimension time series (computing mean value for unavailable sensors) and available sensors/active sensors information in form of conditional vectors, which enable the model to predict engine's condition easily when new engine arrives that has difference set of sensor combination (e.g., new incoming data or test data set wherein the machine learning models (or re-configured neural network) is applied on the test data to perform at least one task type, for example, classification, regression and the like depending upon the application and domain of the use case scenario). More specifically, steps 202 till 210 depict training of the system 100 wherein the training of the system 100 results in outputting machine learning (ML) model(s), and the system 100 is accordingly re-configured so as to apply the ML models on the new test data to perform at least one task type as mentioned above.

Experimental Evaluation:

Datasets Description:

TABLE 1

| Dataset | d | Task | N | K |
|---------|----|------|--------|----|
| DSADS   | 45 | C    | 9,120  | 19 |
| HAR     | 9  | C    | 10,299 | 6  |
| Turbofan | 21 | R   | 519    | —  |

Here, d: maximum available sensors/active sensors in a time series, C: classification, R: regression, N: number of instances, K: number of classes.

As summarized in Table 1, two publicly available activity recognition benchmark datasets have been used by the present discolored that were used by Karim et al., 2019 (e.g., refer Fazle Karim, Somshubra Majumdar, Houshang Darabi, and Samuel Harford. Multivariate lstm-fcns for time series classification. Neural Networks, 116:237-245, 2019.') and a Remaining Useful Life (RUL) estimation Turbofan Engine dataset:

DSADS (Daily and Sports Activities Data Set) [Altun and Barshan, 2010] (e.g., refer 'Kerem Altun and Billur Barshan. Human activity recognition using inertial/magnetic sensor units. In International workshop on human behavior understanding, pages 38-51. Springer, 2010.'): DSADS contained 45 sensors and 19 activities such that each activity was recorded using sensors installed in different body parts, e.g., torso, right arm, left arm, right leg, and left leg.

HAR (Human Activity Recognition Using Smartphones) [Anguita et al., 2012] (e.g., refer 'Davide Anguita, Alessandro Ghio, Luca Oneto, Xavier Parra, and Jorge L Reyes-Ortiz. Human activity recognition on smartphones using a multiclass hardware-friendly support vector machine. In International workshop on ambient assisted living, pages 216-223. Springer, 2012.'): HAR contained 9 sensors and 6 activities (walking, walking upstairs, walking downstairs, sitting, standing, laying) using a smartphone on the waist.

Turbofan Engine (FD002) [Saxena et al., 2008] (e.g., refer 'Abhinav Saxena, Kai Goebel, Don Simon, and Neil Eklund. Damage propagation modeling for aircraft engine run-to-failure simulation. In 2008 international conference on prognostics and health management, pages 1-9. IEEE, 2008.'): Present disclosure and its systems and methods used the FD002 dataset of the turbofan engines dataset repository containing time series of readings for 21 sensors and 3 operating condition variables, such that each cycle in the life of an engine provides a 24-dimensional vector. The sensor readings for the engines in the training set were available from the starting of their operational life till the end of life or failure point, while those in the test set were clipped at a random time prior to the failure, and the goal was to estimate the RUL for these test engines.

Experimental Setup:

Method of the present disclosure was evaluated in two settings: i) Zero shot, and ii) Fine-tuning. In either setting(s), sensor combinations unseen at training time were used while testing. Therefore, the limit of the network has been evaluated to generalize to previously unseen sensor combinations. In zero-shot setting, the trained network as directly used for inference, whereas in fine-tuning setting, a small fraction of labeled time series with same sensor combination as that of the test instance were used for fine-tuning the neural network.

Let $f_{tr}$ and $f_{te}$ denote the fraction of unavailable sensors for each time series during training and testing, respectively. $f_{tr}=(0.25, 0.4)$, and $f_{te}=(0.1, 0.25, 0.4, 0.5)$ are evaluated. Number of available sensor combinations were restricted at training time to 16 so as to mimic a realistic scenario where multiple instances for a particular sensor combination would be available while the number of such combinations itself would be small. From within these 16 combinations, further combinations were generated by randomly masking additional sensors, resulting in a total of 64 sensor combinations seen during training.

For all datasets, around 40% of the instances were used for training, 10% for validation, 10% fine-tuning (ignored in zero-shot case) and remaining 40% for testing. For Turbofan dataset, each time series was divided into overlapping windows of length 100 with a shift of 5. For DSADS and HAR, each input dimension was z-normalized using sensor-wise mean and standard deviation from the train set, whereas sensor-wise min-max normalization was used for Turbofan dataset. Classification error rates and root mean squared error (RMSE) were used by the present disclosure as the performance metrics for the classification and regression tasks, respectively.

Hyperparameters Used:

For all the datasets, the core dynamics module consisted of three GRU layers with 128 units each. The dimension $d_s$ for the sensor embedding vectors or the node vectors and the resulting conditioning vector were chosen to be $$\left[\frac{d}{2}\right].$$

Mini-batch size of 64 and 32 were used for training and 32 for fine-tuning, respectively. All feedforward layers were followed by dropout of 0.2 for regularization in addition to early stopping with a maximum of 150 epochs for training and 50 epochs for fine-tuning. Vanilla SGD optimizer without momentum was used to update the sensor embedding vectors with a learning rate of 5e-4 and Adam optimizer as known in the art was used to update the rest of the layers with a learning rate of 1 e-4. Since the active nodes change in every mini-batch with changing combinations of the available sensors/active sensors, it was observed and found useful to use vanilla SGD for updating the sensor vectors (else, if momentum was used, the vectors for the inactive nodes would also get updated). On the other hand, the GNN and the core dynamics module were shared across all combinations and mini-batches benefit from momentum, and hence Adam was used for updating their parameters.

Baselines Considered:

Method of the present disclosure is referred as GRU-CM (GRU with GNN-based conditioning module). For comparison, the following approaches have been considered:

1. GRU: This is the baseline approach where the dimensions corresponding to the missing sensors are filled with mean value for that sensor. This is equivalent to the method of the present disclosure but without the conditioning module such that GRU is not provided with any additional signal (the conditioning vector) to allow it to adapt to variable dimensionality of the input.

2. GRU with All Sensors Available (GRU-A): For all training and testing instances, all sensors were assumed to be available and a GRU network with same hyperparameters as used in the present disclosure was trained. This provides an upper bound for evaluation.

3. GRU with Maxpool over Sensor Embeddings (GRU-SE): This is an ablation study over GRU-CM where the steps involved in equations (1) and (2) were ignored, and the max operation in Equation 3 was directly applied to the original sensor embedding vectors without any combination specific processing via GNNs. In other words, the active nodes for a specific combination do not exchange messages with each other to allow adaptation to the specific sensors' combination at hand. Instead, the embeddings of the active nodes are directly summarized via the max operation in equation (3).

As a sanity-check, the GRU baseline (without any conditioning modules) was trained from scratch using just the (10%) fine-tuning data available for the test-time sensors combination. This resulted in error rates ≥30% for DSADS and HAR across all % age missing tests (with results degrading with increasing missing % age), and RMSE of around 60.0 for Turbofan dataset, showing the necessity of using the time series instances from other sensor combinations present in the train set.

Results and Observations:

Below Table 2 depicts results comparing the method of the present disclosure—GRU-CM with other baselines/conventional approaches. Classification error rates are reported for DSADS and HAR, while RMSE is reported for Turbofan. (lower numbers are better). GRU-A is the upper bound assuming all the sensors are available at train and test time. The numbers in bold are statistically significant from the rest with p<0.01.

In the ablation study comparing GRU-CM with GRU-SE, it was observed that in most cases GRU-CM performed better than GRU-SE. Furthermore, performance of GRU-SE sometimes degraded than that of the vanilla GRU. These observations prove the importance of message passing amongst the available sensors/active sensors to provide better conditioning vectors.

Though sensor combinations used for testing were strictly different from those seen during training, the trained GRU/GRU-CM models were considered for fine-tuning using the existing training instances which have the highest overlap

TABLE 2

| | | $f_{tr}$ = 0.4 | | | | $f_{tr}$ = 0 |
|---|---|---|---|---|---|---|
| | Zero shot | | Fine tune | | | $f_{te}$ = 0 |
| | GRU-SE | GRU- | GRU | GRU-SE | GRU-CM | GRU-A |
| | 3.7 | 2.8 | 2.5 | 2.4 | 1.9 | 1.5 |
| | 3.1 | 2.9 | 3.3 | 2.6 | 2.2 | 1.5 |
| | 7.8 | 5.9 | 4.7 | 3.4 | 3.3 | 1.5 |
| | 10.8 | 8.9 | 5.2 | 5.3 | 4.4 | 1.5 |
| | 9.3 | 7.9 | 9.0 | 8.6 | 7.5 | 6.3 |
| | 10.4 | 9.1 | 9.5 | 9.4 | 8.5 | 6.3 |
| | 11.8 | 11.4 | 12.1 | 10.7 | 10.5 | 6.3 |
| | 15.0 | 13.8 | 14.6 | 14.7 | 13.3 | 6.3 |
| | 24.8 | 24.4 | 24.1 | 23.3 | 24.0 | 22.4 |
| | 24.8 | 24.4 | 24.2 | 24.3 | 24.0 | 22.4 |
| | 24.5 | 25.2 | 26.4 | 25.2 | 24.7 | 22.4 |
| | 26.3 | 25.9 | 26.3 | 25.6 | 25.2 | 22.4 |

| | | | $f_{tr}$ = 0.25 | | | | |
|---|---|---|---|---|---|---|---|
| | | Zero shot | | | Fine tune | | |
| Dataset | $f_{te}$ | GRU | GRU-SE | GRU-CM | GRU | GRU- | GRU-CM | GRU |
| DSADS | 10 | 2.5 | 2.5 | 1.8 | 1.8 | 2.3 | 1.7 | 4.6 |
| | 25 | 5.5 | 4.9 | 3.5 | 2.3 | 2.9 | 2.1 | 4.6 |
| | 40 | 12.0 | 13.0 | 8.1 | 4.6 | 4.6 | 3.7 | 8.3 |
| | 50 | 21.6 | 21.7 | 15.9 | 6.6 | 8.0 | 6.4 | 10.4 |
| HAR | 10 | 9.2 | 7.0 | 7.5 | 8.4 | 6.5 | 7.1 | 9.1 |
| | 25 | 10.4 | 8.3 | 8.7 | 9.3 | 8.1 | 7.2 | 10.1 |
| | 40 | 12.9 | 9.7 | 11.1 | 11.1 | 9.7 | 10.0 | 12.8 |
| | 50 | 16.1 | 14.6 | 15.4 | 14.7 | 14.0 | 13.9 | 16.1 |
| Turbofan | 10 | 24.2 | 24.9 | 24.0 | 23.2 | 23.4 | 23.3 | 24.9 |
| | 25 | 23.9 | 24.5 | 23.5 | 22.8 | 23.7 | 22.7 | 24.7 |
| | 40 | 26.0 | 26.8 | 25.7 | 24.6 | 26.3 | 24.4 | 26.4 |
| | 50 | 27.1 | 26.8 | 26.2 | 25.4 | 25.5 | 24.9 | 26.7 |

Following key observations were made from the results in Table 2:

The GRU-CM method as described by the present disclosure (via the steps 202 till 210 of FIG. 2 consistently outperformed the vanilla GRU on all three datasets across zero-shot and fine-tuning testing scenarios. In other words, GRU-CM was able to bridge the gap between GRU-A and GRU significantly in most cases proving its robustness to adapt to unseen sensor combinations.

GRU-CM showed significant gains over GRU in zero-shot setting. While fine-tuning for the sensor combinations at test time improved the results for GRU as well as GRU-CM, GRU-CM performed better than GRU depicting better ability to adapt with small amounts of fine-tuning data.

As $f_{te}$ increases, i.e., as the fraction of unavailable sensors at test time increases, the performance of both GRU and GRU-CM degrades. However, importantly, the performance of GRU-CM degraded much more gracefully in comparison GRU showing the advantage of the conditioning module.

with the sensor combination in the test instance. So, instead of relying on new data for fine-tuning the models as studied in Table 2, the system and method of the present disclosure used the closest matching data from the training set in terms of sensor overlap and conduct a side-study on DSADS. Such usage of closest matching data from the training set shall not be construed as limiting the scope of the present disclosure. As shown in Table 3, it is observed by the present disclosure that the results for both vanilla GRU and GRU-CM improve in comparison to zero-shot method, but GRU-CM still performed better than the fine-tuned vanilla GRU method. This highlights the ability of GRU-CM to adapt to new sensor combinations even better than the costly instance-specific fine-tuning of vanilla GRU. More specifically, below Table 3 depicts fine-tuning using instances from the train set with highest overlap with the test instances in DSADS dataset.

TABLE 3

| | Zero-shot | | Fine-tune | |
|---|---|---|---|---|
| | \multicolumn{4}{c}{$f_{tr} = 0.25$} |
| $f_{te}$ | GRU | GRU-CM | GRU | GRU-CM |
| 25 | 5.5 | 3.5 | 4.7 | 3.6 |
| 40 | 12.0 | 8.1 | 11.2 | 8.4 |

Embodiments and systems and methods of the present disclosure describe technical problem of adapting neural networks to varying input dimensionality in context of multivariate time series. This problem is of potential interest in several applications of deep learning in multivariate time series modeling where, despite capturing the behavior of the same underlying dynamical system, different instances of time series capture the behavior via a different set of sensors. The present disclosure mapped this problem to that of adapting the behavior of a core dynamical model of the underlying system via sensor combination-specific conditioning vectors. The conditioning vector as generated by the method of the present disclosure summarizes the available sensor combination for any time series via graph neural networks which inherently allow for combinatorial generalization. The results on three publicly available datasets proved the efficacy of the method of the present disclosure to adapt to new sensor combinations. Though the method of the present disclosure was evaluated for activity recognition and remaining useful life estimation applications, it is to be understood by a person having ordinary skill in the art or person skilled in the art that such examples of evaluation shall not be construed as limiting the scope of the present disclosure and the system and method of the present disclosure can be useful or implemented in other multivariate time series applications where one or more dimensions may be missing at random across time series.

As mentioned above, applications of IoT (or any other applications) involve capturing data from multiple sensors resulting in multi-sensor time series. Existing neural networks-based approaches for such multi-sensor or multivariate time series modeling assume fixed input dimension or number of sensors. Such approaches can struggle in the practical setting where different instances of the same device or equipment come with different combinations of installed sensors. In the present disclosure, neural network models have been trained from such multi-sensor time series having varying input dimensionality, owing to availability/installation of different sensors subset at each source of time series. A neural network architecture of the present disclosure is provided for zero-shot transfer learning allowing robust inference for multivariate time series with previously unseen combination of available dimensions or sensors at test time. Such a combinatorial generalization is achieved by the present disclosure by conditioning the layers of a core neural network-based time series model with a "conditioning vector" that carries information of the available combination of sensors for each time series. This conditioning vector is obtained by summarizing the set of learned "sensor embedding vectors" corresponding to the available sensors/active sensors in a time series via a graph neural network. Method of the present disclosure was evaluated on publicly available activity recognition and equipment prognostics datasets and the evaluation showed that the method of the present disclosure allows for better generalization in comparison to deep gated recurrent neural network baseline(s). Systems and methods of the present disclosure can be implemented in any domain involving applications that capture sensor data (one or more multivariate time series data or multiple instances of multivariate time series data or multiple multivariate time series data), and such domain or examples provided/described (e.g., refer examples of engine provided above) in the present disclosure shall not be construed as limiting the scope of the present disclosure.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:
obtaining, via one or more hardware processors, one or more multivariate time series data from one or more corresponding sensors deployed in a sub-system;
learning via a neural network executed by the one or more hardware processors, for each of the one or more corresponding sensors, a sensor embedding vector based on the one or more multivariate time series data obtained from the one or more corresponding sensors;
generating, using the sensor embedding vector learnt for each of the one or more corresponding sensors, via the neural network executed by the one or more hardware processors, one or more conditional vectors based on number of active sensors being identified amongst the one or more corresponding sensors, wherein the conditional vectors are passed as an additional input to a core dynamics module to adjust internal computations, and activations of the core dynamics module according to combination of the active sensors, wherein the core dynamics module and a conditioning module accounting the sensors available in a particular time series along with sensor embeddings are jointly learnt in an end-to-end fashion through a stochastic gradient descent (SGD), wherein the internal computations refer to processing of imputed multivariate time series data and the conditioning vector through varied layers of the neural network and the activations refer to output of multiple units of the neural network, and the conditional vectors are obtained from updated node vectors based on a dimension-wise maximum value of the sensor embedding vector learnt for each of the one or more corresponding sensors as $v_{s_j} = \max(\{\tilde{v}_k\}_{v_k \in V_i})$, wherein $v_k$ is a node vector, $V_i$ is a set of set of values in the node vector, max operation returns the dimension-wise maximum value across the updated node vectors for a specific combination of sensors and summation over messages across nodes and the max operation provide ability to process varying number of sensors;
imputing, via the neural network executed by the one or more hardware processors, for one or more inactive sensors, one or more identified missing dimensions with one or more values into the one or more multivariate time series data to obtain one or more imputed multivariate time series data allowing to input a fixed-dimensional time series to the core dynamics module capturing temporal patterns or dynamics in the time series data;
re-configuring one or more internal computations and one or more activations in the neural network corresponding to the one or more imputed multivariate time series data based on the one or more generated conditional vectors to obtain a re-configured neural network; and
evaluating the neural network in (i) zero-shot setting, and ii) fine-tuning setting, wherein in the zero-shot setting, a combination of available sensors/active sensors at test time is different from any of the combinations in a training set and a trained neural network is directly used for inference, and in the fine-tuning setting, along with a fixed training set with varied combinations, a small number of instances for same combination as that of a test instance are available for fine-tuning the neural network.

2. The processor implemented method of claim 1, further comprising estimating, via the re-configured neural network, a target variable corresponding to the one or more imputed multivariate time series data.

3. The processor implemented method of claim 1, wherein the one or more values are one of a pre-determined value or an empirically determined value.

4. The processor implemented method of claim 1, further comprising updating the sensor embedding vector of a specific active sensor based on the sensor embedding vector of remaining active sensors.

5. A system, comprising:
a memory storing instructions;
one or more communication interfaces; and
one or more hardware processors coupled to the memory via the one or more communication interfaces, wherein the one or more hardware processors are configured by the instructions to:
obtain one or more multivariate time series data from one or more corresponding sensors deployed in a sub-system;
learn, via a neural network executed by the one or more hardware processors, for each of the one or more corresponding sensors, a sensor embedding vector based on the one or more multivariate time series data obtained from the one or more corresponding sensors;
generate, using the sensor embedding vector learnt for each of the one or more corresponding sensors, via the neural network executed by the one or more hardware processors, one or more conditional vectors based on number of active sensors being identified amongst the one or more corresponding sensors, wherein the conditional vectors are passed as an additional input to a core dynamics module to adjust internal computations, and activations of the core dynamics module according to combination of the active sensors, wherein the core dynamics module and a conditioning module accounting the sensors available in a particular time series along with sensor embeddings are jointly learnt in an end-to-end fashion through a stochastic gradient descent (SGD), wherein the internal computations refer to processing of imputed multivariate time series data and the conditioning vector through varied layers of the neural network and the activations refer to output of multiple units of the neural network, and the conditional vectors are obtained from updated node vectors based on a dimension-wise maximum value of the sensor embedding vector learnt for each of the one or more corresponding sensors as $v_{s_i} = \max(\{\tilde{v}_k\}_{v_k \in V_i})$, wherein $v_k$ is a node vector, $V_i$ is a set of set of values in the node vector, max operation returns the dimension-wise maximum value across the updated node vectors for a specific combination of sensors and summation over messages across nodes and the max operation provide ability to process varying number of sensors;

impute, via the neural network executed by the one or more hardware processors, for one or more inactive sensors, one or more identified missing dimensions with one or more values into the one or more multivariate time series data to obtain one or more imputed multivariate time series data allowing to input a fixed-dimensional time series to the core dynamics module capturing temporal patterns or dynamics in the time series data;

re-configure one or more internal computations and one or more activations in the neural network corresponding to the one or more imputed multivariate time series data based on the one or more generated conditional vectors to obtain a re-configured neural network; and evaluate the neural network in (i) zero-shot setting, and ii) fine-tuning setting, wherein in the zero-shot setting, a combination of available sensors/active sensors at test time is different from any of the combinations in a training set and a trained neural network is directly used for inference, and in the fine-tuning setting, along with a fixed training set with varied combinations, a small number of instances for same combination as that of a test instance are available for fine-tuning the neural network.

6. The system of claim 5, wherein the one or more hardware processors are further configured by the instructions to estimate, via the re-configured neural network, a target variable corresponding to the one or more imputed multivariate time series data.

7. The system of claim 5, wherein the one or more values are one of a pre-determined value or an empirically determined value.

8. The system of claim 5, wherein the one or more hardware processors are further configured by the instructions to update the sensor embedding vector of a specific active sensor based on the sensor embedding vector of remaining active sensors.

9. A computer program product comprising a non-transitory computer readable medium having a computer readable program embodied therein, wherein the computer readable program, when executed on a computing device causes the computing device to:

obtain one or more multivariate time series data from one or more corresponding sensors deployed in a subsystem;

learn, via a neural network executed by one or more hardware processors, for each of the one or more corresponding sensors, a sensor embedding vector based on the multivariate time series data obtained from the one or more corresponding sensors;

generate, using the sensor embedding vector learnt for each of the one or more corresponding sensors, via the neural network executed by the one or more hardware processors, one or more conditional vectors based on number of active sensors being identified amongst the one or more corresponding sensors, wherein the conditional vectors are passed as an additional input to a core dynamics module to adjust internal computations, and activations of the core dynamics module according to combination of the active sensors, wherein the core dynamics module and a conditioning module accounting the sensors available in a particular time series along with sensor embeddings are jointly learnt in an end-to-end fashion through a stochastic gradient descent (SGD), wherein the internal computations refer to processing of imputed multivariate time series data and the conditioning vector through varied layers of the neural network and the activations refer to output of multiple units of the neural network, and the conditional vectors are obtained from updated node vectors based on a dimension-wise maximum value of the sensor embedding vector learnt for each of the one or more corresponding sensors as $v_{s_i} = \max(\{\tilde{v}_k\}_{v_k \in V_i})$, wherein $v_k$ is a node vector, $V_i$ is a set of set of values in the node vector, max operation returns the dimension-wise maximum value across the updated node vectors for a specific combination of sensors and summation over messages across nodes and the max operation provide ability to process varying number of sensors;

impute, via the neural network executed by the one or more hardware processors, for one or more inactive sensors, one or more identified missing dimensions with one or more values into the one or more multivariate time series data to obtain one or more imputed multivariate time series data allowing to input a fixed-dimensional time series to the core dynamics module capturing temporal patterns or dynamics in the time series data;

re-configure one or more internal computations and one or more activations in the neural network corresponding to the one or more imputed multivariate time series data based on the one or more generated conditional vectors to obtain a re-configured neural network; and evaluate the neural network in (i) zero-shot setting, and ii) fine-tuning setting, wherein in the zero-shot setting, a combination of available sensors/active sensors at test time is different from any of the combinations in a training set and a trained neural network is directly used for inference, and in the fine-tuning setting, along with a fixed training set with varied combinations, a small number of instances for same combination as that of a test instance are available for fine-tuning the neural network.

10. The computer program product comprising a non-transitory computer readable medium of claim 9, wherein the computer readable program, when executed on the computing device further causes the computing device to estimate, via the re-configured neural network, a target variable corresponding to the one or more imputed multivariate time series data.

11. The computer program product comprising a non-transitory computer readable medium of claim 9, wherein the one or more values are one of a pre-determined value or an empirically determined value.

12. The computer program product comprising a non-transitory computer readable medium of claim 9, wherein the computer readable program, when executed on the computing device further causes the computing device to update the sensor embedding vector of a specific active sensor based on the sensor embedding vector of remaining active sensors.

* * * * *